US012682112B2

(12) United States Patent
Kao et al.

(10) Patent No.: US 12,682,112 B2
(45) Date of Patent: Jul. 14, 2026

(54) DATA PRIVACY PROTECTION METHOD, SERVER DEVICE AND CLIENT DEVICE FOR FEDERATED LEARNING

(71) Applicant: Industrial Technology Research Institute, Hsinchu (TW)

(72) Inventors: Ming-Chih Kao, Taipei City (TW); Pang-Chieh Wang, Taipei City (TW); Chia Mu Yu, Kaohsiung City (TW); Kang Cheng Chen, Kaohsiung City (TW)

(73) Assignee: Industrial Technology Research Institute, Hsinchu (TW)

( * ) Notice: Subject to any disclaimer, the term of this patent is extended or adjusted under 35 U.S.C. 154(b) by 264 days.

(21) Appl. No.: 18/078,074

(22) Filed: Dec. 8, 2022

(65) Prior Publication Data

US 2024/0152649 A1     May 9, 2024

(30) Foreign Application Priority Data

Oct. 28, 2022    (TW) .................................. 111141023

(51) Int. Cl.
*G06F 21/62*              (2013.01)
(52) U.S. Cl.
CPC ................................. *G06F 21/6254* (2013.01)
(58) Field of Classification Search
CPC .. G06F 21/6254; G06F 21/6245; G06N 20/20
See application file for complete search history.

(56) References Cited

U.S. PATENT DOCUMENTS

| | | | |
|---|---|---|---|
| 8,752,032 B2 | 6/2014 | Johnson et al. | |
| 12,039,998 B1 * | 7/2024 | Kao ......................... | G10L 25/21 |
| 2020/0050951 A1 * | 2/2020 | Wang ..................... | G06N 20/00 |
| 2021/0065002 A1 * | 3/2021 | Samek ................. | G06N 3/0495 |

(Continued)

FOREIGN PATENT DOCUMENTS

| | | |
|---|---|---|
| CN | 111091199 | 5/2020 |
| CN | 112541592 | 3/2021 |

(Continued)

OTHER PUBLICATIONS

"Office Action of Taiwan Counterpart Application", issued on Jun. 14, 2023, p. 1-p. 10.

(Continued)

*Primary Examiner* — Blake I Narramore
(74) *Attorney, Agent, or Firm* — JCIPRNET

(57)              ABSTRACT

The disclosure provides a data privacy protection method, a server device, and a client device for federated learning. A public dataset is used to perform model training on a machine learning model by a server device to generate a gradient pool including multiple first gradients. The gradient pool and the machine learning model are received by a client device. The client device uses a local dataset to perform model training on the machine learning model to obtain a second gradient. A local gradient is selected from the first gradients in the gradient pool according to the second gradient using a differential privacy algorithm by the client device. An aggregated machine learning model is generated by performing model aggregation based on the local gradient by the server device.

17 Claims, 6 Drawing Sheets

(56) References Cited

U.S. PATENT DOCUMENTS

| | | | |
|---|---|---|---|
| 2021/0089922 A1* | 3/2021 | Lu | G06N 3/063 |
| 2021/0216902 A1* | 7/2021 | Sutcher-Shepard | G06N 20/00 |
| 2022/0366320 A1* | 11/2022 | Liu | G06N 3/0442 |
| 2022/0374542 A1* | 11/2022 | Ghazi | G06F 21/6245 |
| 2022/0374544 A1* | 11/2022 | Polychroniadou | G06F 21/6245 |
| 2022/0391778 A1* | 12/2022 | Green | G06N 20/20 |
| 2022/0391779 A1* | 12/2022 | Upadhyay | G06Q 20/145 |
| 2022/0391781 A1* | 12/2022 | Litany | G06N 3/098 |
| 2023/0068386 A1* | 3/2023 | Akdeniz | G06N 3/084 |
| 2023/0289473 A1* | 9/2023 | Arora | G06N 3/084 |
| 2023/0342669 A1* | 10/2023 | Shao | H04L 9/008 |

FOREIGN PATENT DOCUMENTS

| | | |
|---|---|---|
| CN | 113127931 | 7/2021 |
| CN | 113850272 | 12/2021 |
| CN | 114462090 | 5/2022 |
| CN | 114595831 | 6/2022 |
| CN | 114662705 | 6/2022 |
| TW | 202143118 | 11/2021 |
| TW | 202210954 | 3/2022 |
| WO | 2021230449 | 11/2021 |
| WO | 2022016964 | 1/2022 |

OTHER PUBLICATIONS

Xiao Jin et al., "CAFE: Catastrophic Data Leakage in Vertical Federated Learning," 35th Conference on Neural Information Processing Systems, NeurIPS 2021, Dec. 2021, pp. 1-21.

Lichao Sun et al., "LDP-FL: Practical Private Aggregation in Federated Learning with Local Differential Privacy," International Joint Conference on Artificial Intelligence, Jul. 2020, pp. 1-9.

Milad Nasr et al., "Improving Deep Learning with Differential Privacy using Gradient Encoding and Denoising," arXiv:2007.11524v1[cs.LG], Jul. 2020, pp. 1-15.

Keith Bonawitz et al., "Practical Secure Aggregation for Privacy-Preserving Machine Learning," Conference: the 2017 ACM SIGSAC Conference, Oct. 2017, pp. 1-21.

* cited by examiner

110

120_1

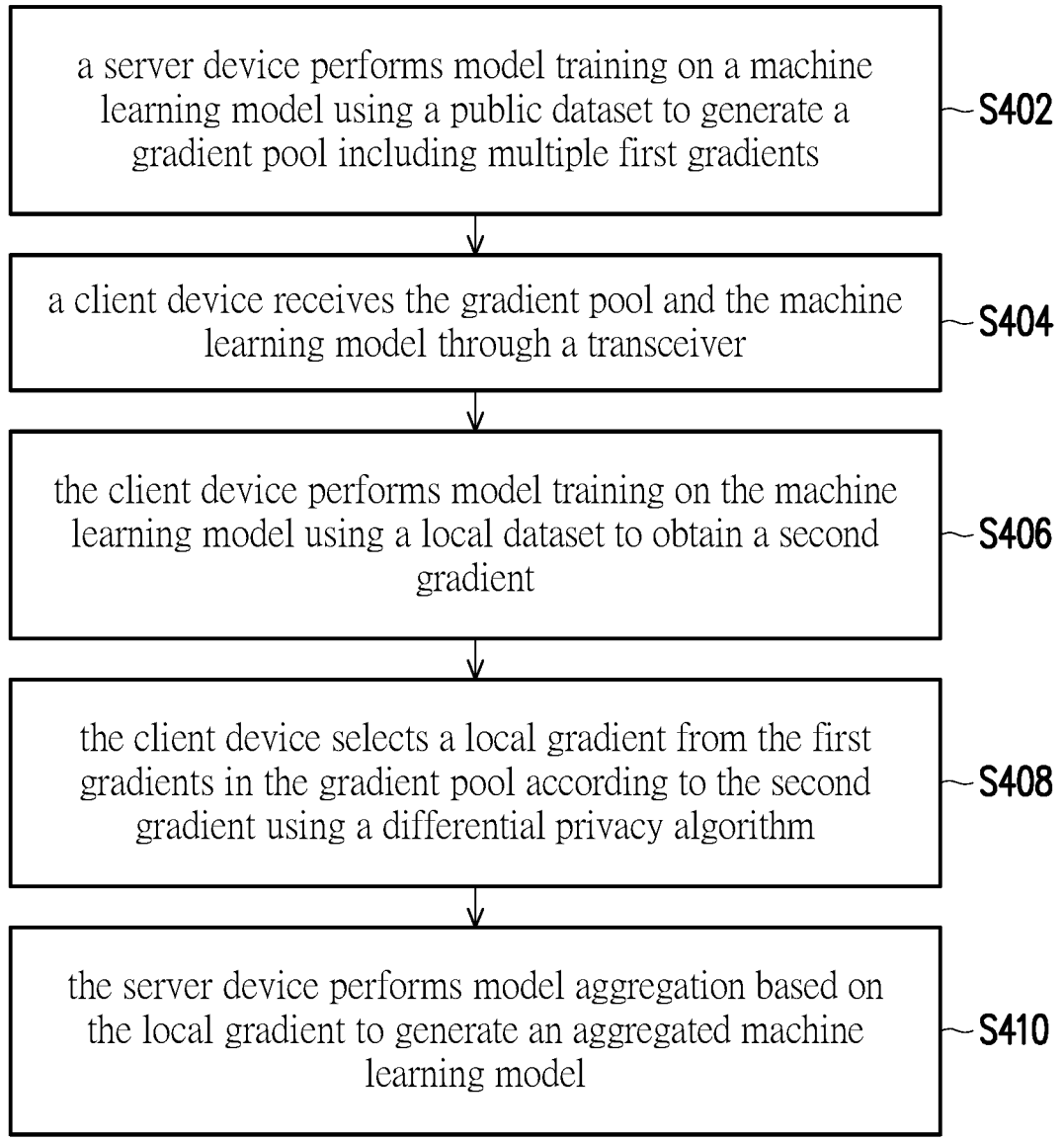

a server device performs model training on a machine learning model using a public dataset to generate a gradient pool including multiple first gradients  ~S402 a client device receives the gradient pool and the machine learning model through a transceiver  ~S404 the client device performs model training on the machine learning model using a local dataset to obtain a second gradient  ~S406 the client device selects a local gradient from the first gradients in the gradient pool according to the second gradient using a differential privacy algorithm  ~S408 the server device performs model aggregation based on the local gradient to generate an aggregated machine learning model  ~S410

FIG. 4

DATA PRIVACY PROTECTION METHOD, SERVER DEVICE AND CLIENT DEVICE FOR FEDERATED LEARNING

CROSS-REFERENCE TO RELATED APPLICATION

This application claims the priority benefit of Taiwanese application no. 111141023, filed on Oct. 28, 2022. The entirety of the above-mentioned patent application is hereby incorporated by reference herein and made a part of this specification.

TECHNICAL FIELD

The disclosure relates to a data privacy protection method, a server device, and a client device for federated learning.

BACKGROUND

In recent years, as data privacy has become increasingly important, centralized machine learning architectures that concentrate training data on a single device for model training have faced challenges in data collection, making Federated Learning (FL), in which multiple client devices work together to train machine learning models, a growing trend. Federated learning can be used to train machine learning models by multiple client devices by sending back gradient information or model weight information by each client device without leaving the client device.

However, recent studies have shown that even when only gradient information or model weight information is obtained, the attacker can still invert the training data, and such an attack is generally known as deep leakage of gradient (DLG). In detail, the gradient information or weight information transmitted instead of the training data is still another representation of the training data itself, so an attacker can still deduce the training data itself from the gradient information or model weight information through appropriate optimization mechanisms. Currently, although federated learning can be combined with techniques such as secure multi-party computation (SMPC/MPC) or homomorphic encryption (HE) to avoid data leakage, there is still a risk of model memorization of the aggregated model after aggregation. That is, the aggregated model may not be generalized, but instead remembers some unique client data, thus making the exposure of the aggregated model potentially compromising the client's data privacy. In the application of training machine learning models through federated learning, the issue of how to protect the data privacy of client devices more effectively is of concern to a person having ordinary skill in the art.

SUMMARY

One of exemplary embodiments provides a data privacy protection method, a server device, and a client device for federated learning that effectively protects data privacy.

One of exemplary embodiments provides a data privacy protection method for federated learning, including the following steps. A server device performs model training on a machine learning model using a public dataset to generate a gradient pool including multiple first gradients. A client device receives the gradient pool and the machine learning model. The client device performs model training on the machine learning model using a local dataset to obtain a second gradient. The client device selects a local gradient from the first gradients in the gradient pool according to the second gradient using a differential privacy algorithm. The server device performs model aggregation based on the local gradient to generate an aggregated machine learning model.

One of exemplary embodiments provides a server device including a transceiver, a storage device, and a processor. The storage device records multiple instructions. The processor is coupled to the transceiver and the storage device, accesses and executes the instructions, and is configured to execute the following steps. Model training is performed on a machine learning model using a public dataset to generate a gradient pool including multiple first gradients. The gradient pool is transmitted to a client device through the transceiver. Model aggregation is performed based on a local gradient to generate an aggregated machine learning model. The local gradient is determined by the client device.

One of exemplary embodiments provides a client device including a transceiver, a storage device, and a processor. The storage device records multiple instructions. The processor is coupled to the transceiver and the storage device, accesses and executes the instructions, and is configured to execute the following steps. A gradient pool and a machine learning model are received from a server device through the transceiver. The gradient pool includes multiple first gradients. Model training is performed on the machine learning model using a local dataset to obtain a second gradient. A local gradient is selected from the first gradients in the gradient pool according to the second gradient using a differential privacy algorithm.

Based on the above, in the embodiment of the disclosure, the server device generates the gradient pool based on the public dataset, and the client device selects the local gradient from the gradient pool based on the differential privacy algorithm, where the selected local gradient is used to replace a gradient generated based on the local dataset. Thus, the aggregated machine learning model may be generated by the server device based on the local gradient satisfying the differential privacy requirements. As a result, the data privacy of the client devices participating in federated learning may be effectively protected.

Several exemplary embodiments accompanied with figures are described in detail below to further describe the disclosure in details.

BRIEF DESCRIPTION OF THE DRAWING

The accompanying drawings are included to provide further understanding, and are incorporated in and constitute a part of this specification. The exemplary drawings illustrate and, together with the description, serve to explain the principles of the disclosure.

FIG. 4 is a flowchart of a data privacy protection method for federated learning according to an embodiment of the disclosure.

DETAILED DESCRIPTION OF DISCLOSED EMBODIMENTS

Figure 1:
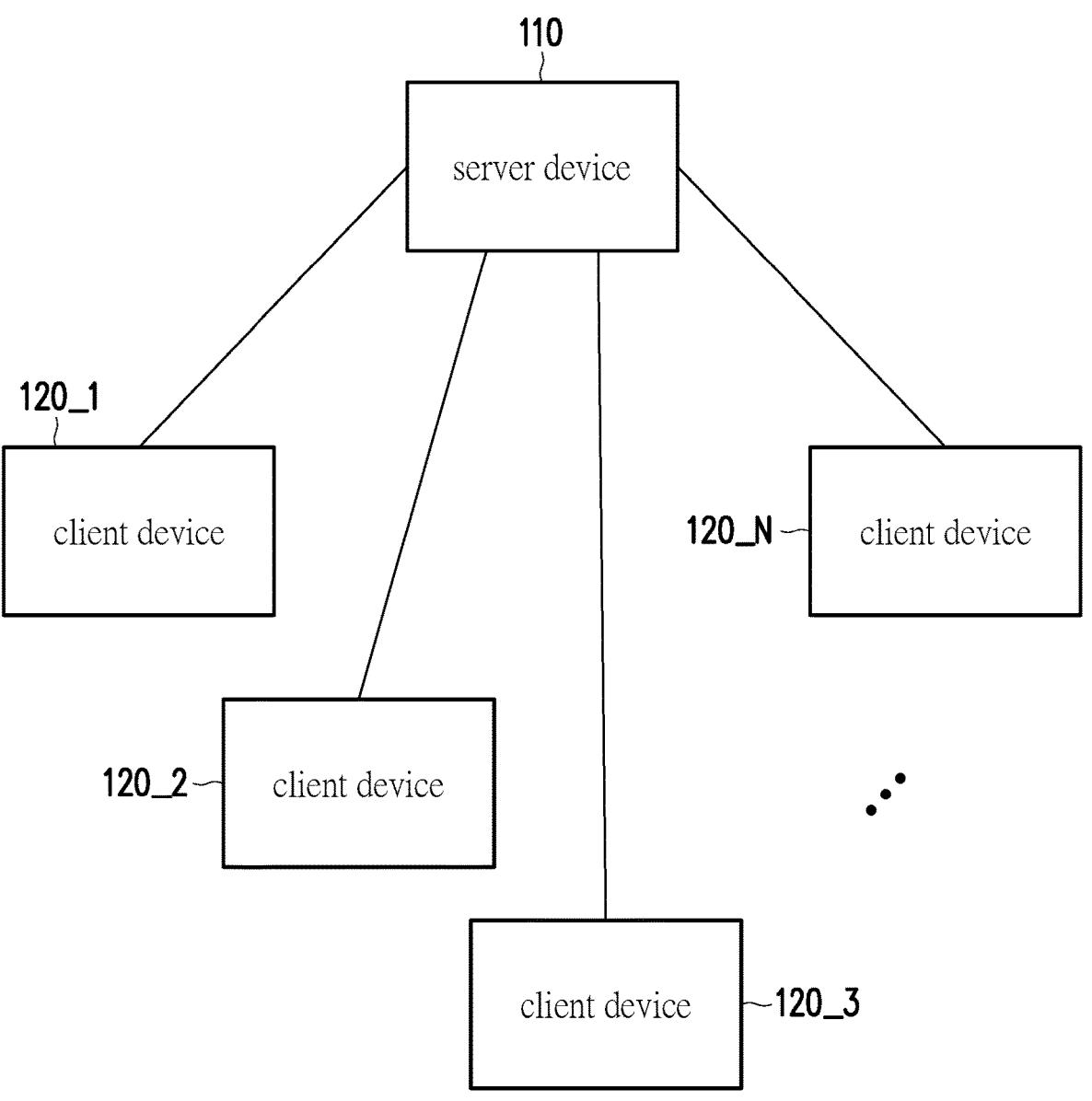
FIG. 1 is a schematic diagram of a machine learning model training system according to an embodiment of the disclosure.

Some of the embodiments of the disclosure will be described in detail with the accompanying drawings. The reference numerals used in the following description will be regarded as the same or similar elements when the same reference numerals appear in different drawings. These embodiments are only a part of the disclosure, and do not disclose all of the ways in which this disclosure can be implemented. More specifically, these embodiments are only examples of the method and devices of the claims of the disclosure.

FIG. 1 is a schematic diagram of a machine learning model training system according to an embodiment of the disclosure. Referring to FIG. 1, a machine learning model training system 10 may include a server device 110 and multiple client devices 120_1 to 120_N. The disclosure does not limit the number of the client devices 120_1 to 120_N, which may be disposed according to actual application. The server device 110 and the client devices 120_1 to 120_N may train a machine learning model based on a federated learning architecture. The federated learning architecture is a decentralized machine learning architecture in which each of the client devices 120_1 to 120_N will be trained locally based on a local dataset thereof, and the server device 110 will integrate local training results of the each of the client devices 120_1 to 120_N to generate a final machine learning model. In other words, the federated learning architecture enables the client devices 120_1 to 120_N to collaboratively train a common machine learning model while ensuring that the local dataset is not publicly available.

In some embodiments, the client devices 120_1 to 120_N may be connected to the server device 110 through a wired or wireless network to enable data transmission over the wired or wireless network. In some embodiments, the client devices 120_1 to 120_N may be, for example, but not limited to, a laptop, smartphone, tablet, desktop, industrial computer, Internet of Things device, or other electronic device with computing capabilities.

Figure 2:
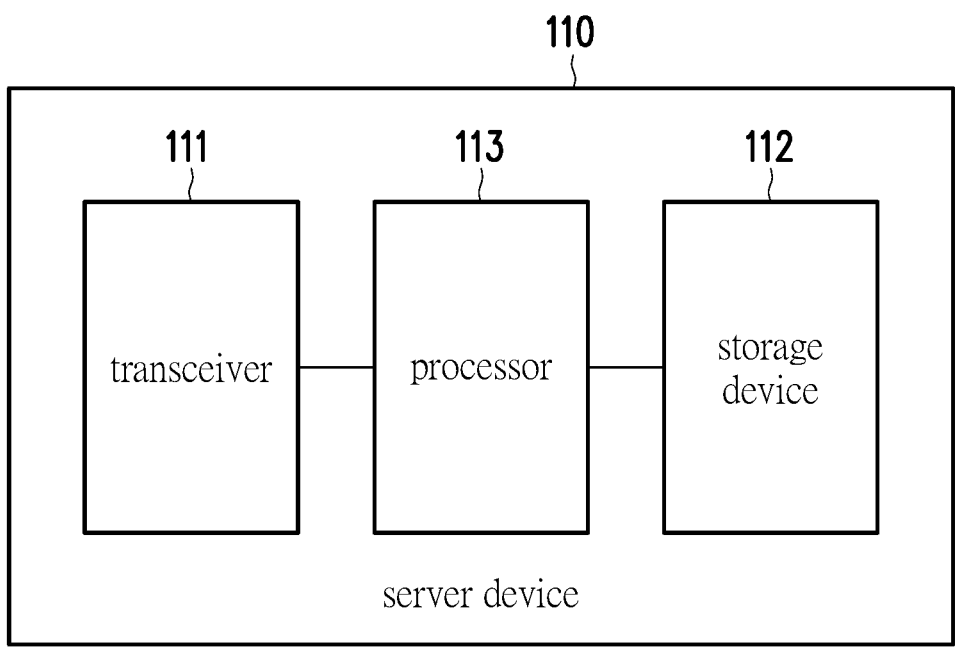
FIG. 2 is a schematic diagram of a server device according to an embodiment of the disclosure.

FIG. 2 is a schematic diagram of a server device according to an embodiment of the disclosure. Referring to FIG. 2, the server device 110 may include a transceiver 111, a storage device 112, and a processor 113.

The transceiver 111 transmits and receives signals wirelessly or by wire. The transceiver 111 may also perform operations such as low-noise amplification, impedance matching, frequency mixing, upward or downward frequency conversion, filtering, amplification, and the like.

The storage device 112 is, for example, any type of fixed or removable random access memory (RAM), read-only memory (ROM), flash memory, hard disk drive (HDD), solid state drive (SSD), or similar element, or a combination thereof, configured to store multiple instructions, code, software modules, or various applications that can be executed by the processor 113.

The processor 113 is, for example, a central processing unit (CPU), or other programmable general-purpose or special-purpose micro control unit (MCU), microprocessor, digital signal processing digital signal processor (DSP), programmable controller, application specific integrated circuit (ASIC), graphics processor (GPU), complex programmable logic device (CPLD), field programmable gate array (FPGA), or other similar elements or a combination of the above elements.

The processor 113 may be coupled to the transceiver 111 and the storage device 112, and access and execute multiple instructions, code, software modules, or various application programs stored in the storage device 112 to implement the data privacy protection method for federated learning, as described in detail later.

Figure 3:
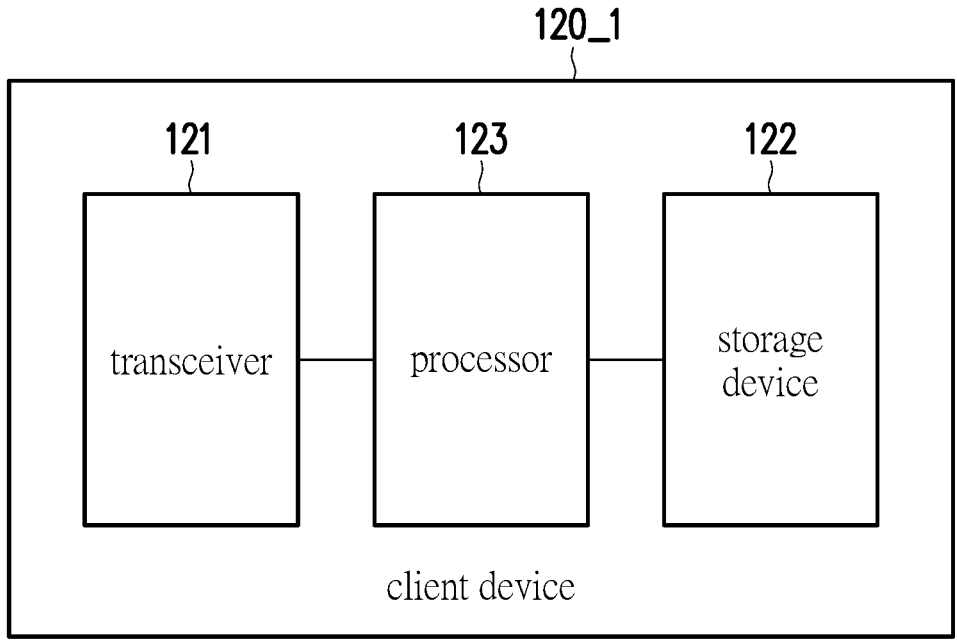
FIG. 3 is a schematic diagram of a client device according to an embodiment of the disclosure.

FIG. 3 is a schematic diagram of a client device according to an embodiment of the disclosure. Referring to FIG. 3, the client device 120_1 may include a transceiver 121, a storage device 122, and a processor 123.

The transceiver 121 transmits and receives signals wirelessly or by wire. The transceiver 121 may also perform operations such as low-noise amplification, impedance matching, frequency mixing, upward or downward frequency conversion, filtering, amplification, and the like.

The storage device 122 is, for example, any type of fixed or removable random access memory, read-only memory, flash memory, hard disk drive, solid state drive, or similar element, or a combination thereof, configured to store multiple instructions, code, software modules, or various applications that can be executed by the processor 123.

The processor 123 is, for example, a central processing unit, or other programmable general-purpose or special-purpose micro control unit, microprocessor, digital signal processing digital signal processor, programmable controller, application specific integrated circuit, graphics processor, complex programmable logic device, field programmable gate array, or other similar elements or a combination of the above elements.

The processor 123 may be coupled to the transceiver 121 and the storage device 122, and access and execute multiple instructions, code, software modules, or various application programs stored in the storage device 122 to implement the data privacy protection method for federated learning, as described in detail later.

It should be noted that, in order to clearly illustrate this disclosure, FIG. 3 and subsequent embodiments are mainly illustrated using the client device 120_1 as an example. However, the structures and operations performed by other client devices 120_2 to 120_N are similar to those of the client device 120_1, as can be inferred without doubt by a person having ordinary skill in the art based on the description of the embodiments of the disclosure.

FIG. 4 is a flowchart of a data privacy protection method for federated learning according to an embodiment of the disclosure. Referring to FIG. 4, the method according to this embodiment is applicable to the machine learning model training system 10 in FIG. 1, and the details of the steps of FIG. 4 are illustrated below with the elements shown in FIG. 1.

In step S402, the server device 110 performs model training on a machine learning model using a public dataset to generate a gradient pool including multiple first gradients. In some embodiments, after the server device 110 determines an architecture of the machine learning model, the server device 110 may perform model training on an initial machine learning model using the public dataset to generate the gradient pool. The first gradients in the gradient pool are generated based on the public dataset, and the first gradients are not related to the local dataset of the each of the client devices 120_1 to 120_N. In some embodiments, the server device 110 may calculate the first gradients according to a loss function of machine learning. The architecture of the machine learning model is, for example, VGG architecture, Inception architecture, ResNet architecture, etc., which is not limited in this disclosure.

In some embodiments, the server device 110 may retrieve multiple sub-datasets from the public dataset. Next, the server device 110 may perform model training on the machine learning model using one of the sub-datasets to generate one of the first gradients. In other words, the server device 110 may perform model training separately according to each of the sub-datasets to generate the first gradients corresponding to the sub-datasets respectively.

For example, during a first training epoch, the server device 110 may retrieve multiple first sub-datasets that are different from each other from the public dataset, and perform model training on the machine learning model accordingly, thus generating a part of the first gradients. During a second training epoch, the server device 110 may retrieve multiple second sub-datasets that are different from each other from the public dataset, and perform model training on the machine learning model accordingly, thus generating an other part of the first gradients.

In step S404, the client device 120_1 receives the gradient pool and the machine learning model through the transceiver 121. Specifically, the server device 110 may transmit the gradient pool and the initial machine learning model to the client device 120_1 through the transceiver 112. Here, the initial machine learning model has an initial model weight. Thus, the client device 120_1 may receive the first gradients and the initial model weight of the machine learning model from the server device 110. Similarly, the server device 110 also transmits the gradient pool and the initial machine learning model to the other client devices 120_2 to 120_N through the transceiver 112.

In step S406, the client device 120_1 performs model training on the machine learning model using the local dataset to obtain a second gradient. Specifically, after receiving the initial machine learning model transmitted by the server device 110, the client device 120_1 may update the machine learning model according to an own local dataset of the client device 120_1 to generate the second gradient according to the loss function of machine learning.

In step S408, the client device 120_1 selects a local gradient from the first gradients in the gradient pool according to the second gradient using a differential privacy algorithm. To avoid leakage of the local dataset due to the transmission of the second gradient, the client device 120_1 may perform data perturbation on the second gradient to obtain the local gradient that satisfies differential privacy requirements. That is, the local gradient generated based on the differential privacy algorithm is used to replace the second gradient for the subsequent process of the federated learning architecture.

In some embodiments, the client device 120_1 maps the second gradient to the local gradient of the first gradients using Laplace mechanism or Gaussian mechanism in the differential privacy algorithm. Specifically, the client device 120_1 may first calculate a distances between the second gradient and the first gradients respectively, for example, the distance between the two gradients based on cosine similarity or Euclidean distance. Then, the client device 120_1 may add random interference noise to calculated distances corresponding to each of the first gradients according to Laplace mechanism or Gaussian mechanism to generate interfered distances that meet the definition of differential privacy. Finally, the client device 120_1 may pick a smallest interfered distance from the interfered distances corresponding to the each of the first gradients, and use the first gradient corresponding to the smallest interfered distance as the local gradient.

In some embodiments, the client device 120_1 maps the second gradient to the local gradient of the first gradients using an exponential mechanism in the differential privacy algorithm. More specifically, when the client device 120_1 utilizes the exponential mechanism, for a given privacy budget c and availability function, the client device 120_1 may calculate probability corresponding to the each of the first gradients according to the following formula (1). According to the definition of the exponential mechanism, an input of a randomized algorithm M is a dataset D; an output of the randomized algorithm M is a physical object $o \in O$; $q(D,o) \rightarrow O$ is an availability function; $\Delta q$ is sensitivity of the function $q(D, r)$.

$$Pr\left[M_q^\epsilon(D) = o\right] = \frac{\exp\left(\frac{\epsilon q(D, o)}{2\Delta q}\right)}{\sum_{o' \in o} \exp\left(\frac{\epsilon q(D, o')}{2\Delta q}\right)} \qquad \text{Formula (1)}$$

In some embodiments, the availability function $q(\ )$ is used to calculate the distances between the second gradient and the first gradients, for example, the distance between the two gradients based on cosine similarity or Euclidean distance. According to formula (1), when the distance between the second gradient and one first gradient is larger, the probability corresponding to this first gradient is larger. After calculating the probability corresponding to the each of the first gradients (i.e., probability of being selected) using formula (1), the client device 120_1 may sample the local gradient according to the probability corresponding to the each of the first gradients, thereby mapping the second gradient to the local gradient in the gradient pool. In the process of calculating the probability corresponding to a first gradient $g1_i$ (where $0 \le K$), D in formula (1) may be substituted into a second gradient $g2$ as an input of the randomized algorithm M. "o" in the numerator of formula (1) may be substituted into the first gradient $g1_i$. "o'" in the denominator of formula (1) is substituted into K first gradients $g1_1$ to $g1_K$ to obtain normalized probability. For example, it is assumed that the gradient pool includes 3 first gradients and the distance between the 3 first gradients and the second gradient is "1", "2", and "3" respectively. When a reciprocal of the distance between the second gradient and the first gradients is the proportion of the probability of being selected, the probability of a first first gradient being selected is $(1/1)/[(1/1)+(1/2)+(1/3)]=6/11$.

Then, in step S410, the server device 110 performs model aggregation based on the local gradient to generate an aggregated machine learning model. The server device 110 may perform model aggregation according to the federated learning algorithm to generate the aggregated machine learning model. The federated learning algorithm is, for example, a FedAvg algorithm or a FedAvg+ algorithm, but is not limited thereto. More specifically, the client device 120_1 may transmit the local gradient or a local model weight updated based on the local gradient to the server device 110. Thus, the server device 110 may generate the aggregated machine learning model according to the local gradient or the local model weight updated based on the local gradient provided by the client device 120_1 and the other client devices 120_2 to 120_N.

In some embodiments, after generating the aggregated machine learning model, the server device 110 may transmit the aggregated machine learning model to the client device 120_1 and the other client devices 120_2 to 120_N. In some embodiments, if the aggregated machine learning model satisfies a convergence condition, the client device 120_1 may directly record a trained aggregated machine learning model for future use. In some embodiments, if the aggregated machine learning model has not yet satisfied the convergence condition, the aggregated machine learning model may be disposed as the initial machine learning model for a next iteration, and the steps shown in FIG. 4 may be repeated.

Figure 5:
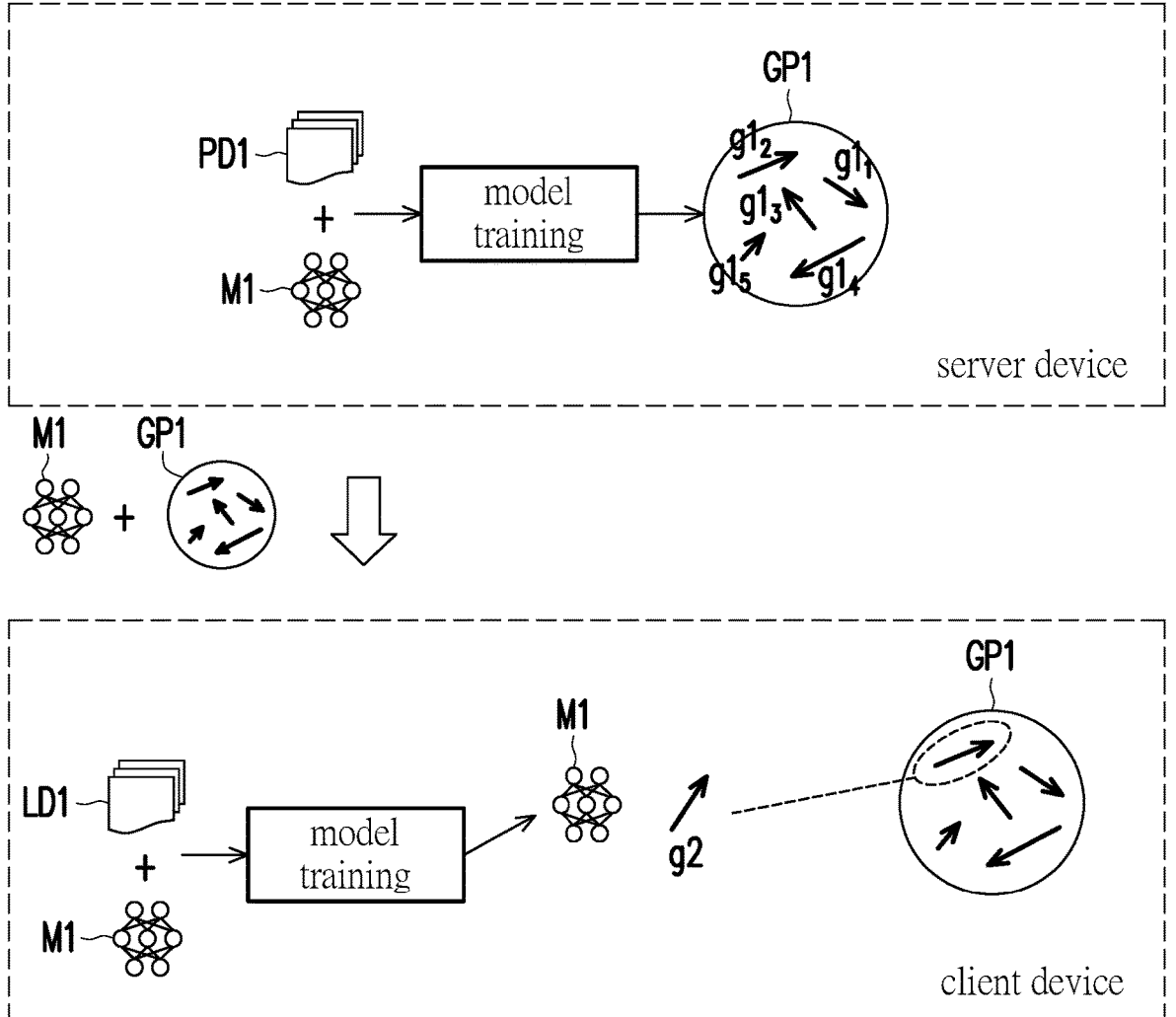
FIG. 5 is a schematic diagram of a data privacy protection method for federated learning according to an embodiment of the disclosure.

FIG. 5 is a schematic diagram of a data privacy protection method for federated learning according to an embodiment of the disclosure. Referring to FIG. 5, the server device 110 may perform model training on a machine learning model M1 according to a public dataset PD1 to generate a gradient pool GP1 including multiple first gradients $g1_1$ to $g1_5$. However, the number of the first gradients $g1_1$ to $g1_5$ shown in FIG. 5 is only exemplary to illustrate the principle of this disclosure clearly, and the disclosure is not limited thereto. The machine learning model M1 may be considered as the initial machine learning model with the the initial model weight From another point of view, the machine learning model M1 is a global machine learning model. Next, the server device 110 may transmit the gradient pool GP1 and the machine learning model M1 with the initial model weight to the client device 120_1 and the other client devices 120_2 to 120_N.

Next, the client device 120_1 may perform model training on the machine learning model M1 according to a local dataset LD1 to obtain a second gradient g2. The client device 120_1 selects a local gradient (i.e., the first gradient $g1_2$) from the gradient pool GP1 according to the second gradient g2 using the differential privacy algorithm.

Then, in some embodiments, the client device 120_1 may transmit the local gradient directly back to the server device 110. Similarly, the other client devices 120_2 to 120_N perform similar operations, and transmit their respective local gradients directly back to the server device 110, so that the server device 110 may perform model aggregation to generate the aggregated machine learning model.

Alternatively, in some embodiments, the client device 120_1 may update the initial model weight of the machine learning model using the local gradient to generate an updated machine learning model. In detail, the client device 120_1 may adjust the initial model weight according to a learning rate and the local gradient to generate an updated local model weight. The updated machine learning model has the updated local model weight. The client device 120_1 may transmit the updated local model weight back to the server device 110. Similarly, the other client devices 120_2 to 120_N perform similar operations, and transmit their respective local model weights updated based on the local gradient directly back to the server device 110, so that the server device 110 may perform model aggregation to generate the aggregated machine learning model.

Figure 6:
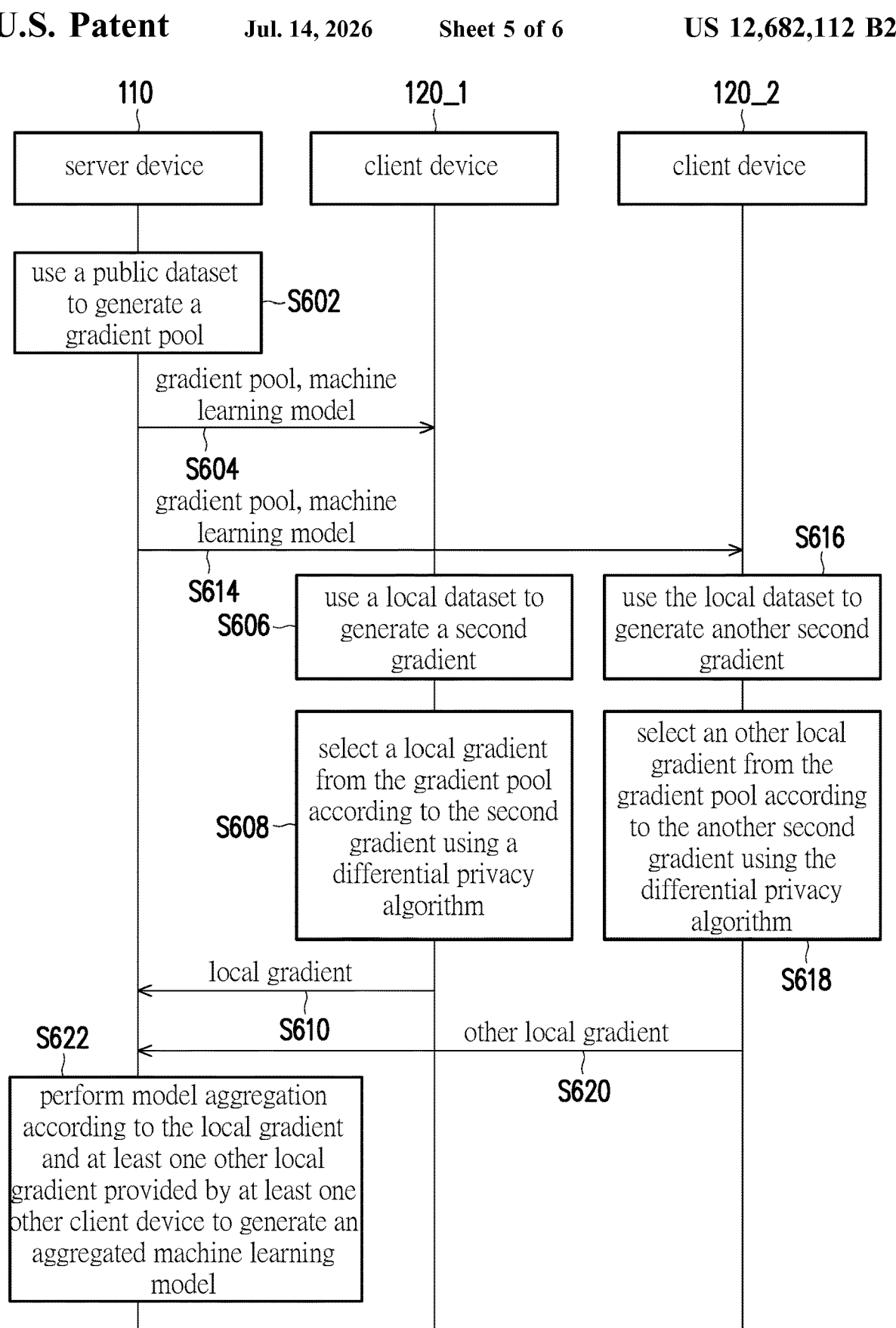
FIG. 6 is a flowchart of a data privacy protection method for federated learning according to an embodiment of the disclosure.

FIG. 6 is a flowchart of a data privacy protection method for federated learning according to an embodiment of the disclosure. To clearly illustrate the principle of the disclosure, the embodiment in FIG. 6 will be illustrated with two client devices 120_1 and 120_2 as examples, but the disclosure is not limited thereto. Referring to FIG. 6, in step S602, the server device 110 performs model training on the machine learning model using the public dataset to generate the gradient pool including multiple first gradients. In step S604, the server device 110 transmits the gradient pool and the machine learning model, and the client device 120_1 receives the gradient pool and the machine learning model. In step S606, the client device 120_1 performs model training on the machine learning model using the local dataset to obtain the second gradient. In step S608, the client device 120_1 selects a local gradient from the first gradients in the gradient pool according to the second gradient using the differential privacy algorithm. In step S610, the client device 120_1 transmits the local gradient to the server device 110, and the server device 110 receives the local gradient.

On the other hand, in step S614, the server device 110 transmits the gradient pool and the machine learning model, and the client device 120_2 receives the gradient pool and the machine learning model. In step S616, the client device 120_2 performs model training on the machine learning model using the local dataset to obtain another second gradient. In step S618, the client device 120_2 selects an other local gradient from the first gradients in the gradient pool according to the another second gradient using the differential privacy algorithm. In step S620, the client device 120_2 transmits the other local gradient to the server device 110, and the server device 110 receives the other local gradient.

In step S622, the server device 110 performs model aggregation according to the local gradient and at least one other local gradient provided by at least one other client device to generate the aggregated machine learning model. Specifically, the server device 110 performs a weighted sum operation on the local gradient and the other local gradient to generate a global gradient. Then, the server device 110 may use the global gradient to update the initial machine learning model to generate the aggregated machine learning model.

Figure 7:
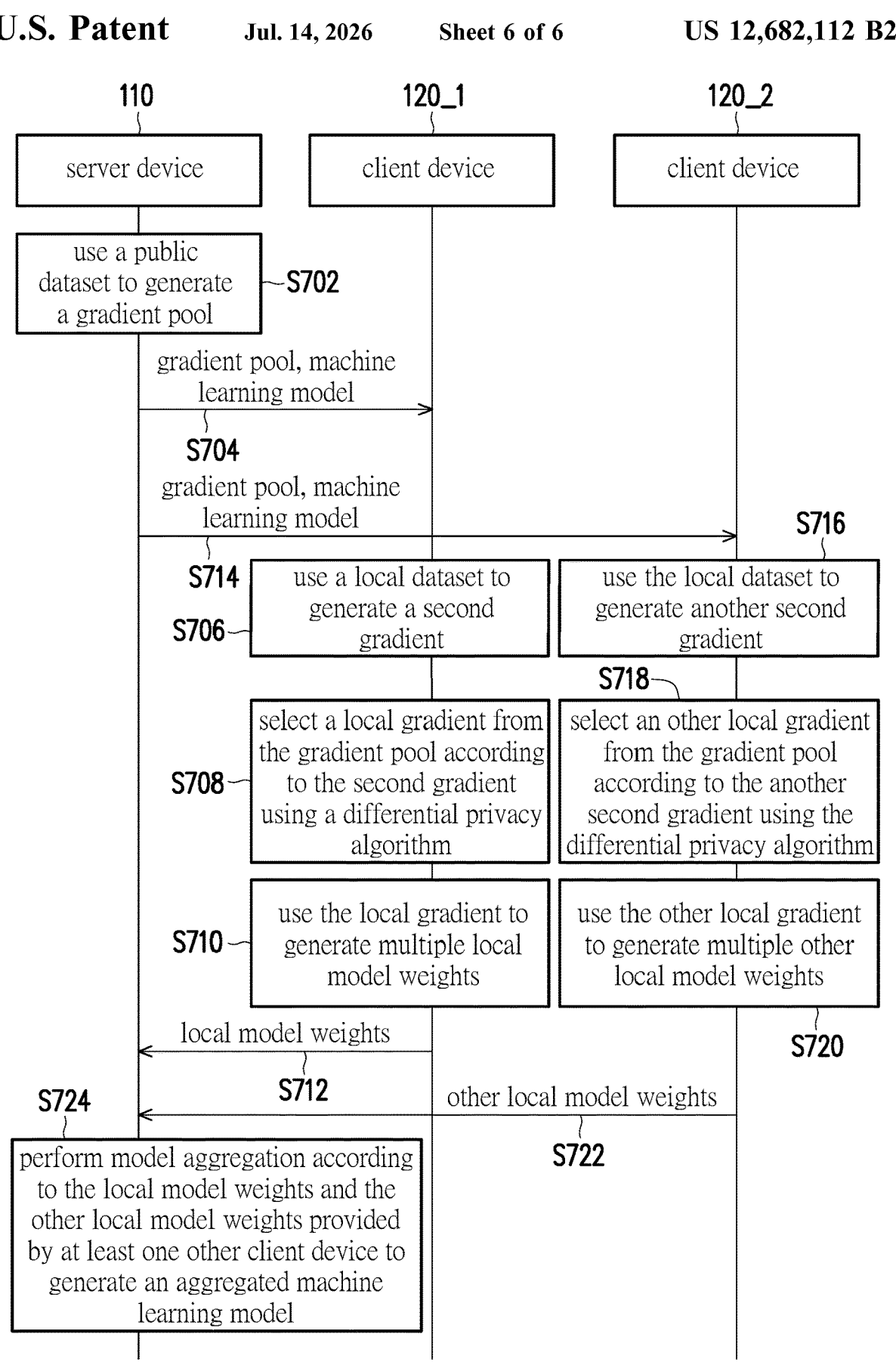
FIG. 7 is a flowchart of a data privacy protection method for federated learning according to an embodiment of the disclosure.

FIG. 7 is a flowchart of a data privacy protection method for federated learning according to an embodiment of the disclosure. To clearly illustrate the principle of the disclosure, the embodiment in FIG. 6 will be illustrated with two client devices 120_1 and 120_2 as examples, but the disclosure is not limited thereto. Referring to FIG. 7, in step S702, the server device 110 performs model training on the machine learning model using the public dataset to generate the gradient pool including multiple first gradients. In step S704, the server device 110 transmits the gradient pool and the machine learning model, and the client device 120_1 receives the gradient pool and the machine learning model. In step S706, the client device 120_1 performs model training on the machine learning model using the local dataset to obtain the second gradient. In step S708, the client device 120_1 selects a local gradient from the first gradients in the gradient pool according to the second gradient using the differential privacy algorithm.

In step S710, the client device 120_1 updates the machine learning model using the local gradient to generate multiple local model weights. In step S712, the client device 120_1 transmits updated local model weights to the server device 110, and the server device 110 receives the local model weights generated based on the local gradient.

On the other hand, in step S714, the server device 110 transmits the gradient pool and the machine learning model, and the client device 120_2 receives the gradient pool and the machine learning model. In step S716, the client device 120_2 performs model training on the machine learning model using the local dataset to obtain another second gradient. In step S718, the client device 120_2 selects an other local gradient from the first gradients in the gradient pool according to the another second gradient using the differential privacy algorithm.

In step S720, the client device 120_2 updates the machine learning model using the other local gradient to generate multiple other local model weights. In step S722, the client device 120_2 transmits updated other local model weights to the server device 110, and the server device 110 receives the other local model weights generated based on the other local gradient.

In step S724, the server device 110 performs model aggregation according to the local model weights and the other local model weights provided by at least one other client device to generate the aggregated machine learning model. Specifically, the server device 110 may perform a weighted sum operation on the local model weights and the other local model weights to generate a global model weight of the aggregated machine learning model to establish the aggregated machine learning model.

To sum up, the data privacy protection method for federated learning according to the embodiments of the disclosure transmits the local gradient determined based on the differential privacy algorithm, thus effectively preventing an attacker from reverse-deriving the private data of the client device from the model training information (e.g., model weights or gradients) submitted by the client device, and also achieving model generalization and protection of unique client data. In addition, the data privacy protection method for federated learning according to the embodiments of the disclosure may save the computational cost of using key encryption and decryption. Moreover, by using the mapping mechanism of the gradient pool to perturb the gradient information at one time, the embodiments of the disclosure may also avoid the performance of the machine learning model from being affected by excessive perturbation of the gradient information.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A data privacy protection method for federated learning comprising:

performing model training on a machine learning model by a server device using a public dataset to generate a gradient pool comprising a plurality of first gradients;

receiving the gradient pool and the machine learning model by a client device;

performing model training on the machine learning model by the client device using a local dataset to obtain a second gradient, wherein the second gradient is not transmitted to the server device;

selecting a local gradient from the first gradients in the gradient pool according to the second gradient by the client device using a differential privacy algorithm, wherein the selecting comprises:

calculating a distance between the second gradient and each of the first gradients, adding random interference noise to the distances to generate a plurality of interfered distances, picking a smallest one of the interfered distances, and selecting one of the first gradient corresponding to the smallest interfered distance as the local gradient; or calculating a distance between the second gradient and each of the first gradients, calculating a probability of each of the first gradients using the distances where a reciprocal of each of the distances is the probability being selected, and sampling the local gradient according to the probabilities; and performing model aggregation based on the local gradient by the server device to generate an aggregated machine learning model.

2. The data privacy protection method for federated learning according to claim 1, wherein selecting the local gradient from the first gradients in the gradient pool according to the second gradient by the client device using the differential privacy algorithm comprises:

mapping the second gradient to the local gradient of the first gradients by the client device using an exponential mechanism in the differential privacy algorithm.

3. The data privacy protection method for federated learning according to claim 1, wherein performing model aggregation based on the local gradient by the server device to generate the aggregated machine learning model comprises:

receiving the local gradient by the server device; and performing model aggregation according to the local gradient and at least one other local gradient provided by at least one other client device by the server device to generate the aggregated machine learning model.

4. The data privacy protection method for federated learning according to claim 3 further comprising:

transmitting the local gradient by the client device to the server device.

5. The data privacy protection method for federated learning according to claim 1, wherein performing model aggregation based on the local gradient by the server device to generate the aggregated machine learning model comprises:

receiving by the server device a plurality of local model weights generated based on the local gradient; and performing model aggregation according to the local model weights and a plurality of other local model weights provided by at least one other client device by the server device to generate the aggregated machine learning model.

6. The data privacy protection method for federated learning according to claim 5 further comprising:

updating the machine learning model by the client device using the local gradient to generate the local model weights; and transmitting the local model weights by the client device to the server device.

7. The data privacy protection method for federated learning according to claim 1 further comprising:

transmitting the aggregated machine learning model by the server device to the client device.

8. The data privacy protection method for federated learning according to claim 1, wherein performing model training on the machine learning model by the server device using the public dataset to generate the gradient pool comprising the first gradients comprises:

retrieving a plurality of sub-datasets from the public dataset by the server device; and performing model training on the machine learning model by the server device using one of the sub-datasets to generate one of the first gradients.

9. A server device comprising:

a transceiver;

a storage device storing a plurality of instructions; and

a processor coupled to the transceiver and the storage device, accessing and executing the instructions, and configured to:

perform model training on a machine learning model using a public dataset to generate a gradient pool comprising a plurality of first gradients;

transmit the gradient pool to a client device through the transceiver, wherein the client device is configured to perform model training on the machine learning model using a local dataset to obtain a second gradient which is not transmitted to the server device, and to select a local gradient from the first gradients in the gradient pool according to the second gradient using a differential privacy algorithm, wherein selecting the local gradient comprises:

calculating a distance between the second gradient and each of the first gradients, adding random interference noise to the distances to generate a plurality of interfered distances, picking a smallest one of the interfered distances, and selecting one of the first gradient corresponding to the smallest interfered distance as the local gradient; or calculating a distance between the second gradient and each of the first gradients, calculating a probability of each of the first gradients using the distances where a reciprocal of each of the distances is the probability being selected, and sampling the local gradient according to the probabilities; and perform model aggregation based on the local gradient to generate an aggregated machine learning model, wherein the local gradient is determined by the client device.

10. The server device according to claim 9, wherein the processor is further configured to:

receive the local gradient from the client device through the transceiver; and perform model aggregation according to the local gradient and at least one other local gradient provided by at least one other client device to generate the aggregated machine learning model.

11. The server device according to claim 9, wherein the processor is configured to:

receive through the transceiver a plurality of local model weights generated based on the local gradient; and perform model aggregation according to the local model weights and a plurality of other local model weights provided by at least one other client device to generate the aggregated machine learning model.

12. The server device according to claim 9, wherein the processor is configured to:

transmit the aggregated machine learning model to the client device through the transceiver.

13. The server device according to claim 9, wherein the processor is configured to:

retrieve a plurality of sub-datasets from the public dataset; and perform model training on the machine learning model using one of the sub-datasets to generate one of the first gradients.

14. A client device comprising:

a transceiver;

a storage device storing a plurality of instructions; and a processor coupled to the transceiver and the storage device, accessing and executing the instructions, and configured to:

receive a gradient pool and a machine learning model from a server device through the transceiver, wherein the gradient pool comprises a plurality of first gradients;

perform model training on the machine learning model using a local dataset to obtain a second gradient, wherein the second gradient is not transmitted to the server device; and select a local gradient from the first gradients in the gradient pool according to the second gradient using a differential privacy algorithm, wherein selecting the local gradient comprises:

calculating a distance between the second gradient and each of the first gradients, adding random interference noise to the distances to generate a plurality of interfered distances, picking a smallest one of the interfered distances, and selecting one of the first gradient corresponding to the smallest interfered distance as the local gradient; or calculating a distance between the second gradient and each of the first gradients, calculating a probability of each of the first gradients using the distances where a reciprocal of each of the distances is the probability being selected, and sampling the local gradient according to the probabilities.

15. The client device according to claim 14, wherein the processor is configured to:

map the second gradient to the local gradient of the first gradients using an exponential mechanism in the differential privacy algorithm.

16. The client device according to claim 14, wherein the processor is configured to:

transmit the local gradient to the server device through the transceiver.

17. The client device according to claim 14, wherein the processor is configured to:

update the machine learning model using the local gradient to generate the local model weights; and transmit the local model weights to the server device through the transceiver.

* * * * *